March 13, 1962

O. L. PATTERSON

APPARATUS FOR PRODUCING A FUNCTION OF THE ABSOLUTE VALUE OF THE DIFFERENCE BETWEEN TWO ANALOG SIGNALS 3,024,995

Filed Aug. 24, 1953

5 Sheets-Sheet 1

INVENTOR.
OMAR L. PATTERSON
BY
Busser, Smith & Harding
ATTORNEYS

March 13, 1962

O. L. PATTERSON 3,024,995

APPARATUS FOR PRODUCING A FUNCTION OF THE ABSOLUTE VALUE OF THE DIFFERENCE BETWEEN TWO ANALOG SIGNALS

Filed Aug. 24, 1953

5 Sheets-Sheet 2

INVENTOR.

OMAR L. PATTERSON

BY

Busser, Smith & Harding

ATTORNEYS

INVENTOR.
OMAR L. PATTERSON
BY
Busser, Smith & Harding
ATTORNEYS

March 13, 1962 O. L. PATTERSON 3,024,995

APPARATUS FOR PRODUCING A FUNCTION OF THE ABSOLUTE VALUE OF THE DIFFERENCE BETWEEN TWO ANALOG SIGNALS

Filed Aug. 24, 1953 5 Sheets-Sheet 4

INVENTOR.
OMAR L. PATTERSON
BY
Busser, Smith & Hardy
ATTORNEYS

March 13, 1962 O. L. PATTERSON 3,024,995

APPARATUS FOR PRODUCING A FUNCTION OF THE ABSOLUTE VALUE OF THE DIFFERENCE BETWEEN TWO ANALOG SIGNALS

Filed Aug. 24, 1953 5 Sheets-Sheet 5

INVENTOR.
OMAR L. PATTERSON
BY
Busser, Smith & Harding
ATTORNEYS

United States Patent Office 3,024,995

Patented Mar. 13, 1962

3,024,995

APPARATUS FOR PRODUCING A FUNCTION OF THE ABSOLUTE VALUE OF THE DIFFERENCE BETWEEN TWO ANALOG SIGNALS

Omar L. Patterson, Media, Pa., assignor to Sun Oil Company, Philadelphia, Pa., a corporation of New Jersey Filed Aug. 24, 1953, Ser. No. 375,952
21 Claims. (Cl. 235—183)

This invention relates to apparatus for adjustment of analog computers or the like and has particular reference to the securing of "least squares" or similar adjustments.

For simplicity of discussion of the present invention it will be assumed that the invention is applied to electrical analog computers or analyzers, though, as will appear, it is equally applicable to analogs of mechanical, acoustic, or various mixed types.

In the design and use of analog computers or other analyzers problems arise which in many cases involve the following considerations:

First, there must be chosen a network (using this term in a quite broad sense) which on a theoretical basis corresponds to the system the behavior of which is sought. For example, if the system to be analyzed involves an equation or equations relating its various constants and variables, a proper analog must involve constants and variables related in accordance with the same equation or equations. As an example there may be considered analogs of oil reservoirs to which the present invention is particularly directed. Such analogs are disclosed in my prior applications, namely application Serial No. 130,270 filed November 30, 1949, now Patent No. 2,727,682 issued December 20, 1955; Serial No. 196,480, filed November 18, 1950, now Patent No. 2,788,938 issued April 16, 1957; and Serial No. 239,279 filed July 30, 1951, now Patent No. 2,855,145 issued October 7, 1958. Reference may be particularly made to these applications since they show typical analogs to which the matters of the present invention are applicable. As said applications point out, the analogs therein disclosed have characteristics satisfying various equations which are also satisfied by oil reservoirs.

When the proper type of analog is chosen, as above indicated, two conditions may well arise in seeking to determine the parameters of the analog. In special cases, all constants of the system undergoing analysis which are essential to the analysis are quantitatively known. Then no difficulty is involved in setting up the analog with its parameters and independent variables related properly to the system.

In other cases the setting up of the analog is not so directly possible. The water drive of an oil reservoir, for example, is known to have as its analog a network of distributed resistances and capacitances which, theoretically, can be satisfactorily replaced by a filter type network of multiple sections of lumped resistances and capicitances, such a network sufficiently approximating for all practical purposes a network with distributed parameters. If the underground conditions of the oil reservoir were fully known, it would be theoretically possible to provide such a filter network with assignment of definite numerical values to its parameters corresponding to values of various parameters of the reservoir, to obtain, for a given elaborateness of the network, the best approximation to the reservoir.

But, actually, the conditions in a reservoir are usually to a major extent unknown. Usually little is known except a past history of pressure variation at a producing region for a past program of production which is generally quite non-uniform. There may be some knowledge of subsurface conditions due to the drilling of wells and to geophysical prospecting, but direct information of physical conditions is usually meager.

However, a possibly valid assumption, borne out by experience, can be made as follows:

If the analog is of a type properly analogous to the system to be analyzed, then if the analog subjected to a particular program of a forcing function (for example, the analog of an oil production program) provides an output (for example, the analog of pressure) and if the forcing function and the output correspond respectively to their historical analogs in the system, it may be validly assumed, if sufficient data is involved, that the analog is a true analog of the system with its parameters properly chosen. Then, furthermore, being a true analog, it is proper to assume that it may be used to predict future history of the system under study. It will now be clear that adjustment of an analog to proper correspondence with a system which it is to represent may be a matter of considerable difficulty if many adjustments of its parameters are required. In a water drive analog network, for example, many resistances and capacitances may have to be involved for proper analogy, and all of these must be adjusted so that, with a certain programmed current withdrawal, corresponding to the historical oil production, there will be secured a potential decline curve corresponding to the history of pressure decline in the reservoir. Tedious trial and error has been required in the past to secure the desired end. After one adjustment is made to improve the correspondence of the produced and desired functions, a later adjustment of another parameter will usually require still further adjustment of the first, and so on.

The broad object of the present invention is to provide apparatus for monitoring the adjustments of an analog or the like to permit them to be made in a fashion leading to rapid convergence to the required settings of the analog parameters.

To indicate how the invention accomplishes this end, reference will be made to a "least squares" type of procedure.

Suppose that the first trial of the analog when subjected to the proper forcing program gives rise to a certain output-time curve. This may be compared with the desired output-time curve corresponding to the known history of the system. Generally, of course, the two curves will correspond very poorly. Suppose that a measure of the deviations of the two curves is now secured on a least squares basis, i.e., by integrating throughout the time period the squares of the instantaneous deviations. One of the parameters of the network may then be adjusted until, as a result of that adjustment, the integral is minimum. Then a second parameter may be adjusted until a new minimum value of the integral is obtained, and so on through all of the parameters. After one such complete series of adjustments, the adjusting procedure may be again repeated, each parameter being adjusted in turn to give new minimum integrals. Repeating this a necessary number of times, there will be secured, if the procedure is convergent, as in proper cases it will be, settings of all of the parameters such that if any one were adjusted, either positively or negatively, the value of the integral would increase.

The resulting settings of the parameters then would correspond to the best least squares fit of the obtained and desired curves. If the two curves were then found to fit sufficiently closely throughout their periods, the analog would be properly set up for prediction of future behavior of the system.

(It will not be particularly pertinent here to discuss in detail the significance of convergence to an unsatisfactory correspondence of the curves, multiple minimum values of the integrals obtained, or the like; the procedure must, of course, be used with due regard to the mathematical conditions involved, utilizing such knowledge as is available to distinguish spurious from useful results. If, for example, an error is made in the choice of a type of analog, it is not to be expected that the procedure indicated will converge as desired. The same may be true if initial parameter values are chosen too far afield. Usually, sufficient information will be available to insure that initial assumptions are within the region from which convergence will properly occur. It will hereafter be assumed that the invention is applied to a proper type of analog, that sufficient data is available to give the required information for a proper adjustment of the analog, and that initial values are chosen such that the procedure will be convergent to a useful result.)

The approximating process described would be, obviously, for any other than a simple system prohibitively complex if the curves had to be individualy plotted and the integrals calculated fo reach parameter adjustment.

In accordance with the invention, however, the elaborate process described is carried out in very simple and rapid fashion. Utilizing the invention, the program is applied to the analog repeatedly in cycles having a frequency which, typically, may be of the order of 250 cycles per second, though this frequency may be widely varied if desired. The desired output-time function is generated at this same frequency. The actual and desired functions have their squared differences integrated in each cycle and the integral is readable on a meter. The result is that the adjustment of any parameter to a minimum integral reading is a matter of no more than a few seconds at most, with the result that even a large series of adjustments, each involving a large number of individual adjustments, may be readily made in a very short time.

For initial simplicity of description references have been made which are unduly specific. In accordance with the invention there may be indicated not only the integrals described, but instead point by point summations as will hereafter appear. Or various other comparisons may be made, in particular between selected points of the obtained and desired functions.

Furthermore, while reference has been made to least squares fits of curves, there is no extraordinary significance involved in considering "least squares" as contrasted with least values of integrals of other powers or functions of absolute values of differences. The classical theory of least squares is founded upon certain well justified assumptions of distribution of errors and has many practical advantages in calculation; but it is recognized that other equally justifiable assumptions of distribution of errors would lead to other minimum summations or integrals. When actual computation is not involved and when results are obtained automatically, as with the present invention, there is no particular reason to involve least squares, and as will appear more fully hereafter, the invention may involve the minimizing of sums or integrals of other powers or functions of the absolute values of differences to secure "fits" of produced and desired functions which are for all practical purposes just as valid and useful. In fact, generally, the fits produced utilizing different mathematical approaches in line with the invention are indistinguishable from the standpoint of results and their validity to the extent justified by the accuracy of the data presented.

The attainment of the foregoing general object and of other objects particularly relating to details of construction and operation will become apparent from the following description read in conjunction with the accompanying drawings, in which.

The apparatus which will be specifically described involves various parts of an analog of an oil reservoir some of which may be replaced by corresponding elements of analogs such as described in my prior applications referred to above. However, for consistent description, there will be described herein an apparatus which is complete in itself, it being understood, however, that various portions particularly devoted to the attainment of correspondence between an output and a given function could be associated with the devices of said prior applications.

Figure 1:
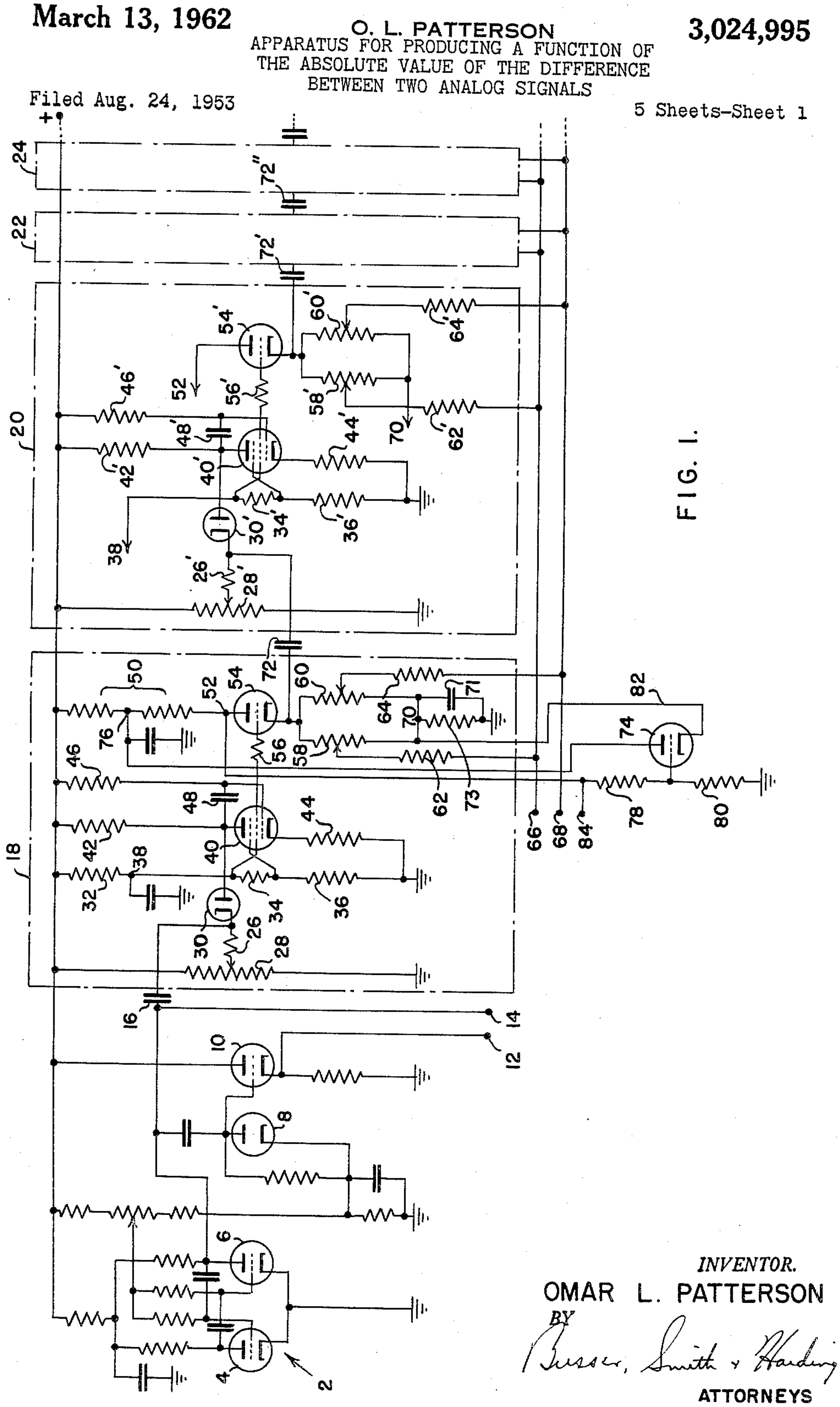
FIGURE 1 is a portion of the wiring diagram of the apparatus particularly showing a multivibrator and wave former and connections to a group of phantastrons provided for timing.

Referring first to FIGURE 1, there are illustrated therein certain timing elements involved in producing and controlling the repetitive cycles of operation of the apparatus.

A free running multivibrator is provided at 2 and comprises the triodes 4 and 6 in a conventional circuit. A square wave is generated and the output from the anode of triode 6 is clipped by the arrangement of diode 8 and is delivered to the grid of triode 10 which is in a cathode follower arrangement. The cathode of triode 10 is connected to an output terminal 12, while another output terminal 14 is connected directly to the anode of triode 6. The output from the anode of triode 6 is differentiated by the condenser 16 and resistance 26 which is connected to a potentiometer 28 located between the positive potential supply line and ground. An input is thus provided to a phantastron circuit indicated at 18 which constitutes the first of a group of phantastron circuits others of which are diagrammed or indicated at 20, 22 and 24, there being a sufficient number of these to provide desired time steps during a repetition cycle of operation.

The differentiated input signal to the phantastron circuit 18 is delivered through diode 30 to the anode of the pentode 40. The suppressor and screen grids of this pentode have proper positive potentials applied thereto through the medium of the group of series resistors 32, 34 and 36 provided between the positive supply line and ground. The junction point 38 between resistors 32 and 34 has additional connections as will be hereafter mentioned. The pentode has associated with it anode and cathode resistors 42 and 44, respectively. The control grid is connected to the positive potential supply line through resistance 46 and is coupled to the anode through condenser 48. A pair of resistances 50 are connected at 52 to the anode of a triode 54 the grid of which is connected through resistance 56 to the screen grid of pentode 40. Potentiometers 58 and 60 are connected in parallel between the cathode of triode 54 and a junction point 70 which is connected through resistance 73 to ground, resistance 73 being shunted by the condenser 71. The contacts of the respective potentiometers 58 and 60 connect through resistances 62 and 64 to lines which are respectively connected to the terminals 66 and 68. The output from the phantastron circuit 18 is delivered through condenser 72 which, like condenser 16, forms an element of a differentiating circuit.

A triode 74 has its anode connected to the junction 76 between the resistances 50. Connection 52 is joined to an output terminal 84 and through a resistance 78 to the grid of triode 74, the grid being connected to ground through resistance 80. The cathode of triode 74 is connected at 82 to the junction 70.

The phantastron operates in essentially conventional fashion, the negative pulse introduced through diode 30 serving to provide a positive pulse at the screen of pentode 40 which persists for a time determined by the setting of contact of potentiometer 28. The positive pulse at the screen of the pentode 40 provides a corresponding positive pulse at the cathode of triode 54 which is in what is essentially a cathode-follower arrangement. Details of this operation will be given later, but it will suffice at the present time to point out that the positive pulse at the cathode of triode 54 is differentiated and at its termination a negative pulse is provided to trigger the phantastron circuit which is indicated generally at 20.

The phantastron circuit 20 is quite similar to the circuit 18 and the parts which correspond are designated by similar reference numerals with primes appended. Particularly to be noted in connection with the phantastron circuit 20 is that various connections as indicated by the arrows are made to the junctions 38, 52 and 70 which are shown in the circular of phantastron 18. The further phantastrons 22, 24 etc. are identical with phantastron circuit 20 and are similarly conncted at their appropriate points to the junctions 38, 52 and 70. The coupling of the negative pulses to initiate phantastron operation is effected successively through the condensers 72, 72′, 72″ etc.

In brief, from the standpoint of timing alone, the phantastron circuits provide successively positive pulses at the cathodes of their triodes 54, 54′ etc. which have durations depending upon the settings of the contacts of potentiometers 28, 28′ etc. When the positive pulse of one phantastron terminates the positive pulse of the next phantastron is initiated, and at its termination there is initiation of a positive pulse of the next. Thus there are provided successive periods of positive condition of the cathodes of the varoius triodes in these circuits.

Attention may now be centered on the point 52 to which are connected the anodes of all the triodes 54, 54′ etc. Since there is a common anode resistor arrangement 50 involved, the positive potential steps appearing at the cathodes of the triodes are, in effect, inverted and appear as successive negative steps at this junction point. At the times of transitions of the positive steps at the cathodes, transient positive pulses appear at the junction 52 and are delivered at the terminal 84 for use as hereafter described. It may also be noted that when there is no positive pulse at any of the triode cathodes, the terminal 52 will be positive. At such time the triode 74 will become conductive to maintain substantially constant the current flowing through resistance 73 with the result that the junction 70 is held at a nearly fixed potential which is easily filtered by the condenser 71. It is to be noted that the resistance 73 carries the cathode currents successively from the triodes 54, 54′ etc.

Figures 2, 3:
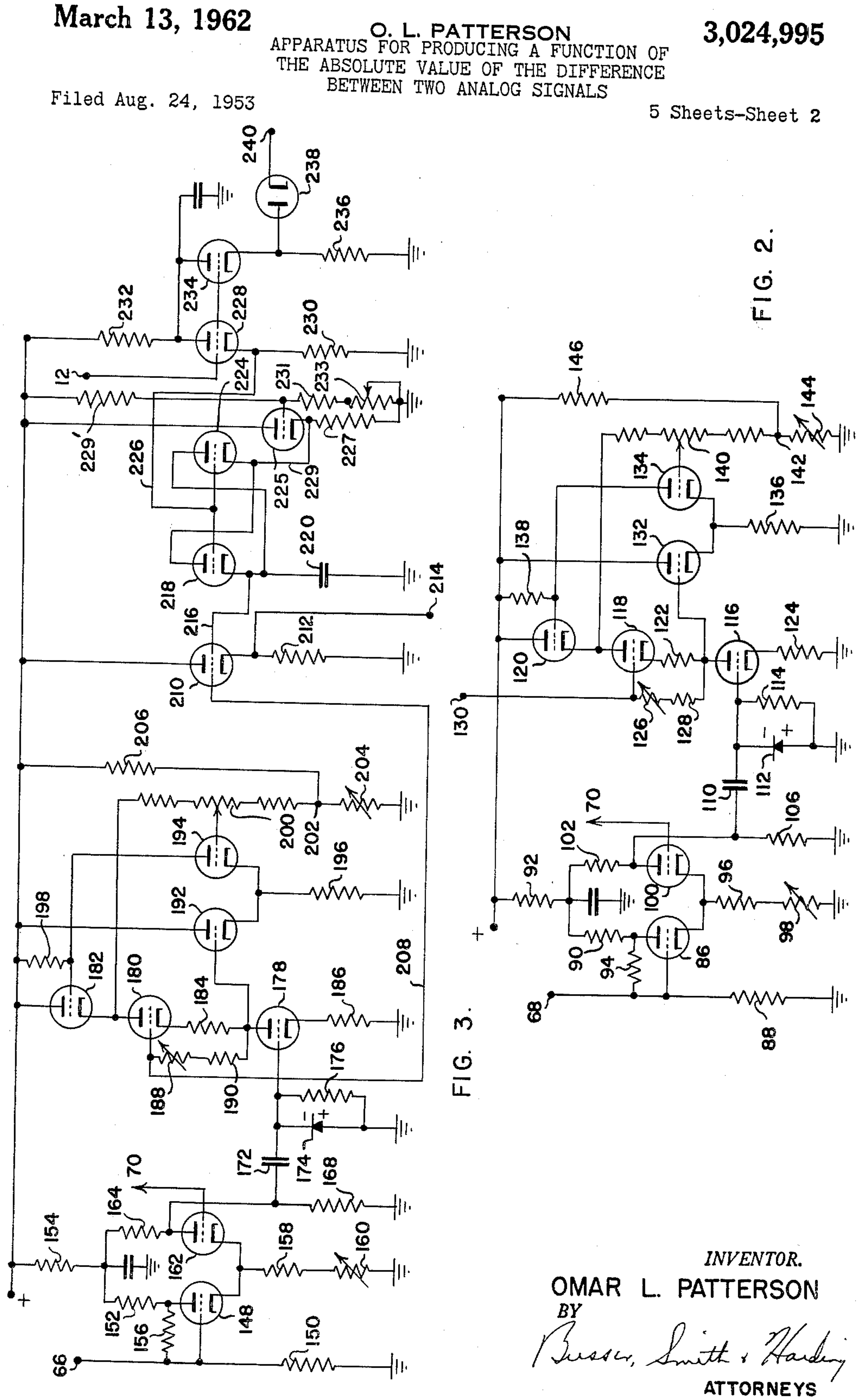
FIGURE 2 is a portion of the wiring diagram showing, in particular, a current withdrawal circuit.
FIGURE 3 is a further portion of the wiring diagram showing, in particular, an adding and integrating circuit.

Reference may now be made to FIGURE 2 which shows a current withdrawal circuit. A triode 86 has its grid connected to the terminal 68 to which, as illustrated in FIGURE 1, there are connected the adjustable contacts of potentiometers 60, 60′, etc. through the equal resistors 64, 64′, etc. The grid of triode 86 is connected to ground through resistance 88. The anode of triode 86 is connected to the positive potential supply line through resistors 90 and 92, and a feedback from the anode to the grid of triode 86 is provided through resistance 94. A second triode 100 has its cathode connected to the cathode of triode 86 and through resistance 96 and adjustable resistance 98 to ground. The anode of triode 100 is connected through resistance 102 to the junction of resistances 90 and 92. The grid of triode 100 is connected to the constant potential junction 70 shown in FIGURE 1. The result of the arrangement is that signals provided at terminal 68 in the form of positive steps successively appearing at the cathodes of the triodes 54, 54′ etc. are delivered from the anode of triode 100 through condenser 110 to the grid of a triode 116 which is clamped at ground by reason of the arrangement of the diode 112 and the shunting resistance 114. The diode 112 may be a germanium crystal or the equivalent.

Triode 116 is associated with triodes 118 and 120 and resistances 122 and 124 in a cascode constant current circuit to provide a current withdrawal through a terminal 130 in proportion to the waveform which appears at the grid of triode 116. The resistances 122 and 124 are desirably substantially equal and the grid of triode 118 is connected to the anode of triode 116 by a series arrangement of adjustable and fixed resistances 126 and 128, respectivly. A pair of triodes 132 and 134 have their cathodes connectd together and to ground through a resistance 136. The anode of triode 134 is connected to the grid of triode 120 and to the positive potential supply line through a resistance 138. The joined cathode of triode 120 and anode of triode 118 are connected through a resistance arrangement including potentiometer 140 and variable resistor 144 to ground. The ungrounded end of variable resistor 144 is connected at 142 to the positive potential supply line through resistance 146. The adjustable contact of potentiometer 140 is connected to the grid of triode 134. The operation of the last described circuit need not be detailed here since it is fully described in my application Serial No. 196,480 referred to above. It will here suffice to state that a very accurate linear relationship is maintained betwen the current withdrawn through terminal 130 and the signal potential applied to the grid of triode 116, the proportionality ratio being adjusted by the adjustment of resistance 126. The particular result achieved by the circuit is to insure the proportionality of the current to the introduced waveform irrespective of the potential which may exist at terminal 130 which, as will appear hereafter, is the output potential of a water drive network which will vary substantially during a cycle of repetition of operation.

The overall operation of FIGURE 2 may be briefly described as follows:

It will be noted that terminal 68 which is the input terminal in FIGURE 2 is connected to the lower ends of all of the resistors 64, 64′, etc. in FIGURE 1. The settings of the potentiometer contacts above these resistances determine the respective values of positive potentials which are applied to terminal 68 during the corresponding intervals in which pulses are applied in the respective phantastron circuits to the potentiometer contacts. A step waveform is thus applied to terminal 68, the steps changing at the times of transition of operation from each phantastron circuit to the next. The pattern of potentials thus applied correspond to and control current flow through terminal 130. The result is the establishment during each cycle of operation of a definite current withdrawal program.

Reference may now be made to FIGURE 3. Comparison of this figure with FIGURE 2 will reveal that it is identical with FIGURE 2 from terminal 66 through the portion of the circuit involving an output through line 208 rather than to terminal 130. Triodes 148 and 162 correspond respectively to triodes 86 and 100 and like them are provided with the resistance arrangement 152, 164 and 154 running to the positive potential supply line and with the resistances 158 and 160 to ground. The terminal 66, which corresponds to terminal 68, connects to the grid of triode 148 which is joined to ground through resistance 150. Anode to grid feedback is provided at 156. The grid of triode 100 is connected to the terminal 70 shown in FIGURE 1. The output from the anode of triode 162 is delivered through condenser 172 and it will be noted that resistances 168 and 176 and diode 174 correspond to the respective elements in FIGURE 2.

The waveform through condenser 172 is delivered to the cascode arrangement of triodes 178, 180 and 182 associated with resistances 184 and 186, while triodes 192 and 194 are respectively connected as previously described in connection with FIGURE 2, the connections involving resistance 198, potentiometer 200, variable resistance 204 and resistance 206 connected to the variable resistance at 202. The anode of triode 178 is connected to the grid of triode 180 through resistances 188 and 190, the former of which is adjustable, and the grid of triode 180 is connected through line 208 to an integrator which will now be described. So far the arrangement is identical with that in FIGURE 2.

A triode 210 is arranged in a cathode follower arrangement with cathode resistor 212, hte cathode of triode 210 being connected to a terminal 214 to which further reference will be made hereafter. The connection of line 208 is not only to the grid of triode 210 but, through 216, to the cathode of a triode 218 which is connected to the ungrounded side of a condenser 220, the other side of which is grounded. A triode 224 is connected with its anode to the cathode of triode 218 and its cathode to the anode of triode 218, the grids of the triodes 218 and 224 being connected together and through line 226 to the cathode of a triode 228. A triode 225 has its anode connected to the positive potential supply terminal and is in a cathode follower arrangement with cathode resistor 227. Its cathode is connected at 229 to the anode of triode 218 and the cathode of triode 224. Its grid is connected to an adjustable potential point of the arrangement of resistors 229' and 231 and rheostat 233. The grid of triode 228 is connected to the terminal 12 of FIGURE 1. The anode of triode 228 is connected through resistance 232 to the positive potential supply line, and its cathode is connected to ground through resistance 230. Another triode 234 has its anode connected to the anode of triode 228, its grid connected to the grid of triode 228 and its cathode connected through resistance 236 to ground. The cathode of triode 234 is connected to the anode of a diode 238 the cathode of which is connected to a terminal 240.

In this circuit of FIGURE 3, if resistance 184 is made suitably smaller than resistance 186, current will flow into condenser 220 through resistances 188 and 190 when the potential of the grid of triode 178 is less than, for example, ten volts. When this potential is greater than ten volts the current flow is from the condenser 220 so that it discharges. The operation of the entire circuit is such that the waveform of potential across condenser 220 consists of a succession of straight line segments, the slopes of which are adjusted by the potentiometers 58, 58', etc., and the durations of which are adjusted by the phantastron timing potentiometers. Thus the waveform taken from the cathode follower 210 can be made to correspond with any desired curve within the limitations imposed by the finite number of straight line segments. It is this waveform at terminal 214 which is adjusted to represent the predetermined pressure decline curve of the analog.

As will appear hereafter the connection of triode 234 to termianl 12 provides a charging circuit through diode 238 and terminal 240 for the water drive network of the analog.

The connection of terminal 12 to triode 228 provides for charging (or discharging) condenser 220 to an initial potential in each repetition cycle corresponding to the potential at the cathode of triode 225 which is determined by the adjustment of its grid potential by rheostat 233. When the potential applied to terminal 12 is negative, triodes 218 and 224 are cut off (since both their cathodes are normally positive as will immediately appear). When the square wave potential at 12 is positive, however, the triodes form a bidirectional short circuit of low impedance between condenser 220 and the cathode of the cathode follower triode 225 so that the ungrounded condenser terminal attains substantially the potential of this cathode. That this is so will become clear by noting that if the cathode of 225 is more positive than the condenser terminal, current flow may occur through 229 and triode 218; whereas if the reverse condition exists, current flow may occur through triode 224 and connection 229.

Figure 4:
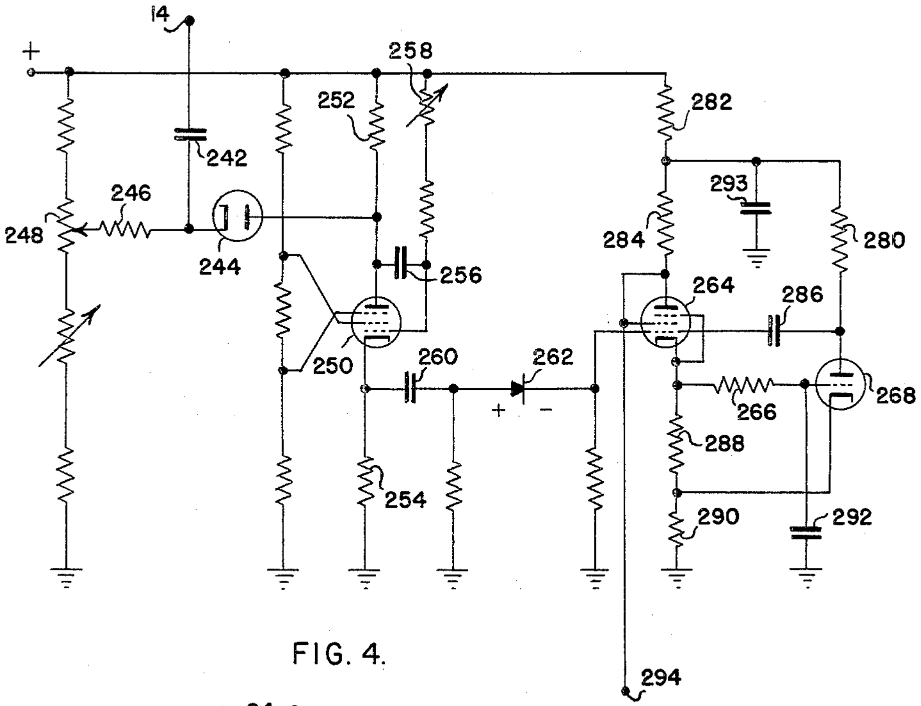
FIGURE 4 is a portion of the wiring diagram showing a pulse former.

In FIGURE 4 there is shown the portion of the circuit which involves a phantastron employed to provide a timing pulse which may be accurately delayed with respect to the start of each cycle. Terminal 14 of FIGURE 1 is connected through condenser 242 to the cathode of a diode 244, which cathode is also connected through resistance 246 to the contact of a potentiometer 248 which is connected with fixed and adjustable resistances in series between the positive potential supply line and ground. A pentode 250 is provided in phantastron arrangement similar to that previously described, its anode being connected through resistance 252 to the positive potential supply line and its cathode being connected to ground through resistance 254. Feedback between its grid and anode is provided by condenser 256, and the grid is connected to the positive potential supply line through resistances of which resistance 258 is adustable. A condenser 260 connects the cathode of pentode 250 to a diode 262 associated with a pair of resistances running to ground and delivering its output to the control grid of a pentode 264 the anode of which is connected to the positive potential supply line through resistances 282 and 284 while its cathode is connected to ground through resistances 288 and 290. The cathode of pentode 264 is connected through resistance 266 to the grid of triode 268, the anode of which is connected through condenser 286 to the control grid of pentode 264 and through resistance 280 to the junction of resistances 282 and 284 which are connected to ground through condenser 293. The cathode of triode 268 is connected to the junction of resistances 288 and 290. The grid of triode 268 is connected to ground through condenser 292. The circuit is arranged to deliver a short negative pulse to terminal 294 from the anode of pentode 264. The operation of this pulse former need not be specially described since it is described on page 182 of volume 19 of Radiation Laboratory Series.

Figure 5:
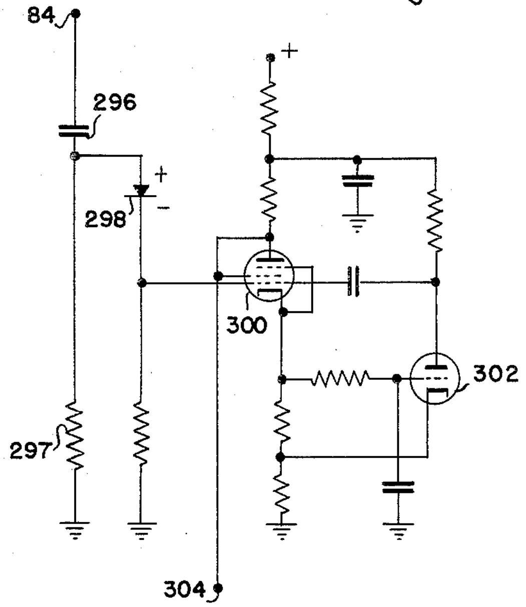
FIGURE 5 is a further portion of the wiring diagram showing another pulse former.

Referring particularly to FIGURE 5, the combined step waveform appearing at the common anodes of triodes 54, 54', etc. and delivered at terminal 84 in FIGURE 1 is differentiated by the arrangement of condenser 296 and resistance 297 and applied through diode 298 to the control grid of a pentode 300 which is associated with a triode 302 in the same type of circuit as that involving pentode 264 and triode 268 in FIGURE 4. The output from the anode of pentode 300 is delivered at terminal 304, at which occurs a series of pulses occurring at the termination of each individual phantastron step.

Figure 6:
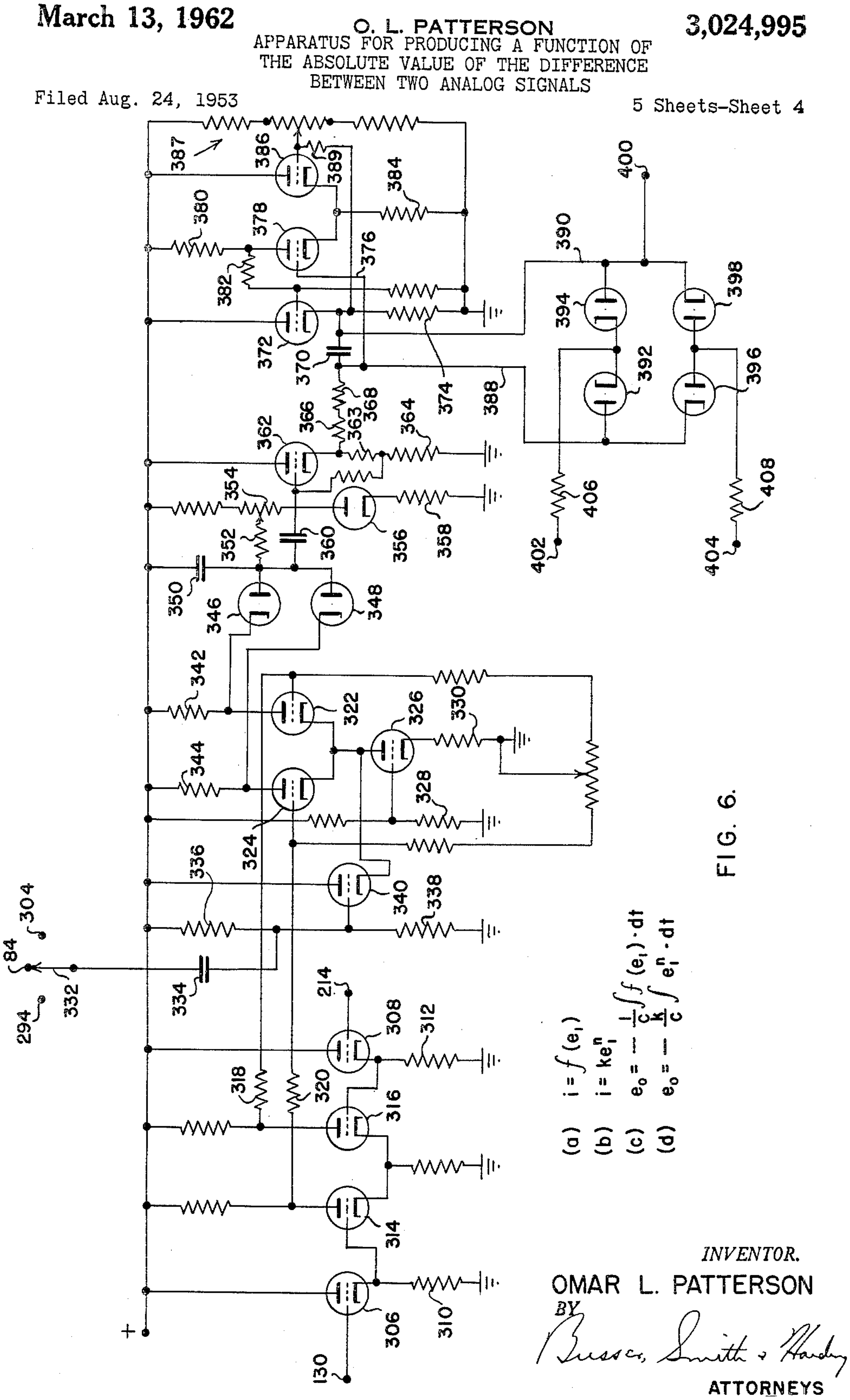
FIGURE 6 is a portion of the wiring diagram showing a differential and output circuit, together with certain equations pertinent thereto.

Referring now to FIG. 6, a pair of triodes 306 and 308 arranged as cathode followers with cathode resistors 310 and 312 have their control grids respectively connected to the terminals 130 and 214 of FIGURES 2 and 3. The cathodes of these triodes are connected to a differential amplifier of conventional type comprising the triodes 314 and 316 and their usual connections, the outputs from these triodes being delivered through resistors 318 and 320 to the respective grids of triodes 322 and 324. The cathodes of triodes 322 and 324 are connected together and to the anode of a constant current triode 326 the cathode of which is connected through resistance 330 to ground and the grid of which is connected to a point 328 of a series resistance arrangement extending between the positive potential supply line and ground. A switch 332 may be selectively connected to any one of terminals 294, 84 and 304 for purposes hereafter described. The switch 332 is connected through condenser 334 to the grid of a triode 340 which is connected to the junction of a pair of resistances 336 and 338 arranged between the positive potential supply line and ground. The arrangement described constitutes a switch such that 340 is normally conducting, its grid being at a sufficient positive potential, so that it supplies all of the current required by the constant current triode 326 with the result that triodes 322 and 324 are normally cut off. When, however, a negative signal is applied through condenser 334 to the grid of triode 340, this triode is cut off and triodes 322 and 324 become conductive. The outputs from the triodes 322 and 324 are taken from their anodes which are connected to the positive potential supply line through resistances 342 and 344. These outputs are delivered to the cathodes of diodes 346 and 348 the anodes of which are connected together and to the positive potential supply line through condenser 350 and also through resistance 352 to a potentiometer 354 located between the positive potential supply line and the anode of a diode 356 the cathode of which is connected to ground through resistance 358, this diode being provided for drift compensation. The connected anodes of diodes 346 and 348 are also connected to the grid of a triode 362 through condenser 360, the triode 362 being in a cathode follower circuit with the cathode resistors 363 and 364. A pair of resistances 366 and 368 of which 368 is non-linear are connected to the cathode of triode 362 and through condenser 370 to the cathode of a triode 372 which is also a cathode follower having a cathode resistance 374. The junction of resistance 368 and condenser 370 is connected at 376 to the grid of a triode 378 which has its anode connected to the positive potential supply line through resistance 380 and to the grid of triode 372 through resistance 382. The cathode of triode 378 and the cathode of another triode 386 are connected together and to ground through a resistance 384. The grid of triode 386 is connected to an adjustable positive potential point of the resistances 387 between the positive supply terminal and ground, while its anode is connected directly to the positive potential supply line. The adjustable connection to resistances 387 serves for zero adjustment so that no integration occurs during the absence of a signal at the grid of triode 362.

The junction of resistance 368 and condenser 370 is connected at 388 to a swiching arrangement of diodes 392, 394, 396 and 398. The connection 388 is to the anode of diode 392 and the cathode of diode 396. The anode of diode 394 and the cathode of diode 398 are connected at 390 to the cathode of triode 372 and to an output terminal 400. The cathodes of diodes 392 and 394 are connected together and through a resistance 406 to a terminal 402. The anodes of diodes 396 and 398 are connected together and through a resistance 408 to a terminal 404.

The operation of the circuit shown in FIGURE 6 is as follows:

Considering a single repetition cycle of the apparatus, two, generally different, potential waveforms appear simultaneously at 130 and 214. Assuming that triode 340 is cut off throughout the period of duration of interest of these input potential waveforms during the cycle, by reason of a signal applied through switch 332 and condenser 334, there will appear at the anodes of triodes 322 and 324 signals of opposite sign, each corresponding to the instantaneous difference between the inputs at 130 and 214. Assuming that the common potential of the anodes of diodes 346 and 348 is set at the no-signal potential of the anodes of triodes 322 and 324, it will be evident that only that diode which is connected to the anodes of a triode which is caused to deviate negatively will conduct at any instant. Accordingly, the signal delivered through condenser 360 to the grid of triode 362 will at any instant be the negative of the absoulte value of the difference between the signals at 130 and 214. A corresponding potential is delivered from the cathode of triode 362.

Assuming the diodes 392, 394, 396 and 398 non-conducting, the line 388 consequently effectively open, the portion of the circuit involving linear resistor 366, non-linear resistor 368 and triodes 372, 378 and 386 and their associated elements may be considered. As will appear, the left-hand terminal of condenser 370 is virtually at the potential appearing at the grid of triode 386. This potential is adjusted, by the potentiometer at the grid of triode 386, so that it is equal to the potential at the cathode of triode 362 when no signal is impressed on its grid. If a signal is received at the grid of triode 362, providing a potential change of $e_1$ at the cathode of triode 362, the current $i$ through the resistors 366 and 368 will be given in equation ($a$) in FIGURE 6, the functional relationship being dependent upon the current-potential characteristic of the non-linear resistor 368 as modified by the linear current-potential characteristic of the linear resistor 366. Using a "thyrite" resistor at 368, the characteristic of that resistor will approximately conform to a power law, and the characteristic of the series arrangement of resistors 366 and 368 will also conform to a power law, as indicated at ($b$), wherein $n$ may be determined by suitable choices of the resistors. While, as will be discussed hereafter, $n$ may have arbitrary values (generally desirably greater than unity), it may be assumed for simplicity of description that $n$ is approximately 2.

The left-hand terminal of condenser 370 is maintained virtually at the potential at the grid of triode 386 by the negative feedback action of the differential amplifier comprising tubes 378, 386 and 372.

It will be evident from the foregoing that, line 388 being effectively open, the current $i$ flowing through resistors 366 and 368 must also flow through the condenser 370, the capacity of which will be assumed to be C. Designating the change in potential at the cathode of triode 372 as $e_0$, it will be evident that the relation ($c$) holds for the general condition ($a$), or that ($d$) holds for the power condition ($b$), when the gain of the differential amplifier constituted by triodes 378 and 386 is sufficiently high. Such gain may be provided, if desired, by positive feedback between the cathode of triode 372 and the grid of triode 386 through a resistor 389.

Summarizing, the potential $e_0$ at the cathode of triode 372 will be proportional to the integral, over the period (or sub periods) of interest, of the $n$th power of the absolute values of the differences between the waveforms appearing at 130 and 214. If the integration is continuous through a long portion of the repetition cycle, a corresponding integral is obtained. On the other hand, if potentials appear at the cathode of triode 362 only at certain instants of the repetition cycle, i.e. for only subintervals of short duration, the integration becomes, effectively, a summation of the $n$th powers of particular instantaneous values of the instantaneous absolute differences between the waveforms appearing at 130 and 214. Or, if only a single "instant" of the repetition cycle is sampled, the integration reduces, effectively, to the evaluation of the difference of the waveforms at that "instant." As will appear, the choice of these several types of results is afforded by selection of switch 332 to engagement with the several contacts 84, 294 and 304.

The diodes 392, 394, 396 and 398 provide means for discharging the condenser 370 at the end of each repetition cycle and for restoring the potential of its right-hand terminal to its initial value. This result is achieved by rendering terminal 402 negative and terminal 404 positive. The diodes then conduct providing short circuiting of the condenser, and initial potential conditions are established through the differential amplifier control of current through triode 372 as above described. The square waves at terminals 402 and 404 are provided from the multivibrator 2 through a transformer, not shown.

Figure 7:
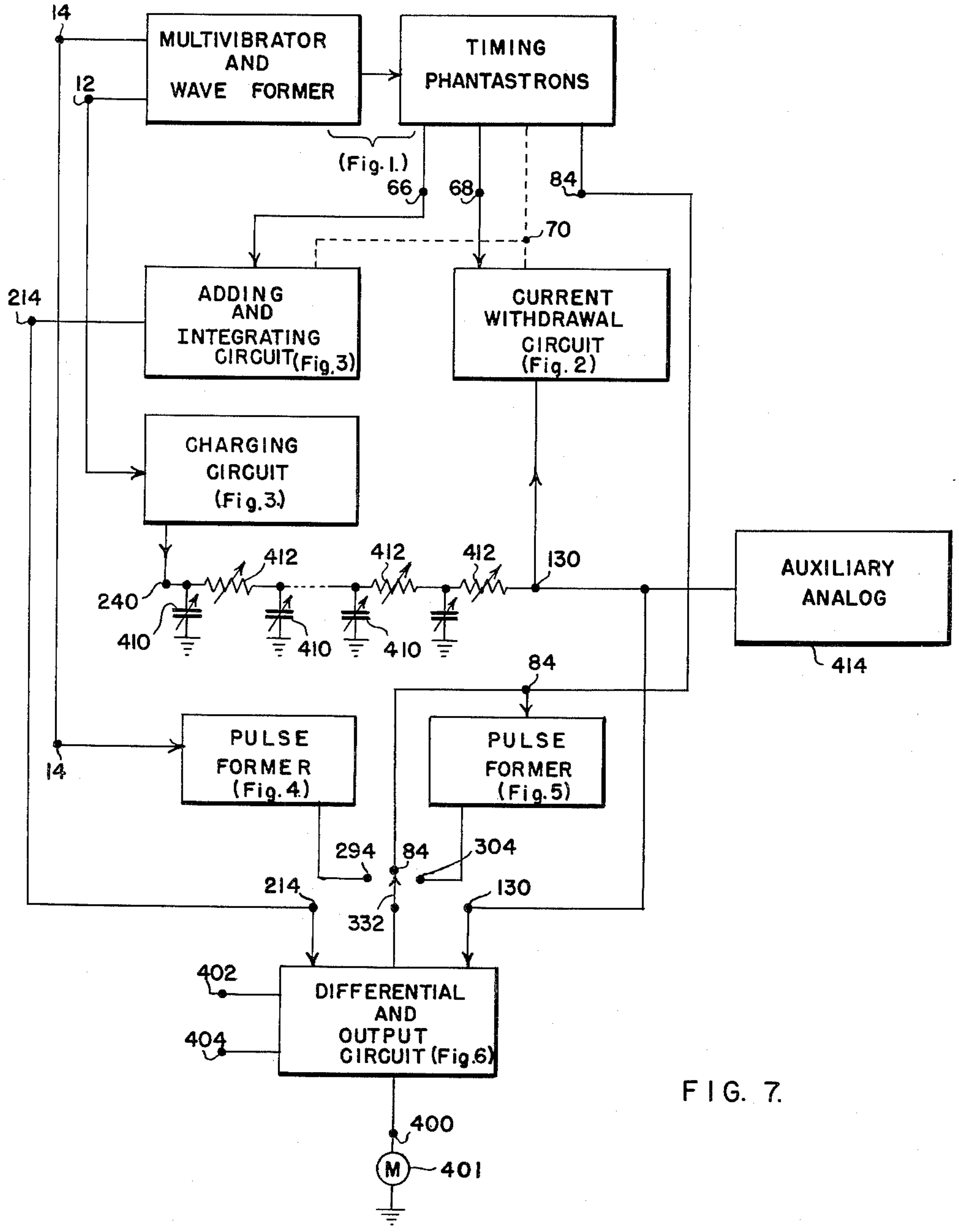
FIGURE 7 is a block diagram showing the association of the various portions of the circuit shown in FIGURES 1 to 6, inclusive, along with other elements of the apparatus.

Referring now to FIGURE 7, there are shown therein in primarily block diagram the various circuit assemblies which have been discussed above, these being indicated with reference to the figures in which they appear. The various terminals involved in their interconnections are indicated in this figure. The figure additionally shows a typical water drive network consisting of a filter arrangement of variable condensers 410 and variable resistors 412. The left-hand ungrounded terminal of this network is terminal 240 previously described while the right-hand ungrounded terminal of the network is terminal 130 previously described. This water drive network corresponds to any of the various water drive networks disclosed in my prior applications referred to above, and as therein pointed out, the condensers 410 may be variable through large ranges being, in fact, dynamic capacitance circuits providing sufficient ranges of capacity for effective use. The resistances 412 may be continuously variable or, as pointed out in said applications, may generally consist of groups of resistances which may be switched selectively into the circuit. At 414, connected to the terminal 130, there is indicated an auxiliary analog. This may be of various forms but, in particular, may consist of analog assemblies such as disclosed in my various prior applications referred to above, this representing, for example, the space analog arrangement of my application Serial No. 130,270, the gas cap analog of my application Serial No. 196,480, or the analog providing operation in accordance with the material balance equation of an oil reservoir as disclosed in my application Serial No. 239,279. It will, of course, be understood that in supplying such an auxiliary analog to the water drive network the programming devices disclosed in said applications may be in whole or in part replaced by the devices disclosed herein or, alternatively, the devices disclosed herein may be replaced by those of said applications. In any event, and more generally, the device represented at 414 may be considered to constitute in whole or in part an analog having parameters which may be subject to adjustment in the same general fashion as the condensers 410 and resistances 412. The water drive network and the auxiliary analog 414 are illustrated separately in FIGURE 7 merely to provide an indication of how the present invention is applied in the case of an oil reservoir analyzer. From a much more general standpoint, the terminal 240 would represent merely the source for restoration of an analog to an initial condition at the beginning of a cycle while the terminal 130 would represent one or more terminals providing a forcing function in a repetitive cycle and/or the response of the analog. The single terminal 130 could, in fact, be two separate terminals connected to entirely different parts of the analog being analyzed.

There may now be summarized the purpose and function of the described apparatus with reference to FIGURE 7. The network 410, 412 and the auxiliary analog 414 may be considered as constituting together a valid type of analog of the system the operation of which is to be predicted but, initially, the values of the parameters involved in the analog will be unknown and require adjustment to make the analog correspond quantititively to the given system. All that is assumed known is the past behavior of the system, which in the specific case of an oil reservoir would be the known variation of pressure at a producing region under a past program of oil withdrawal. To this there must be made to correspond the variation of potential at terminal 130 corresponding to a particular program of current withdrawal at terminal 130. Specifically, the variable parameters of the network and auxiliary analog 414 must be adjusted to attain this correspondence.

With the variable parameters arbitrarily initially set (though with utilization of any knowledge available which will serve to make their initial settings reasonably proper), the subjection of terminal 130 in a single cycle of repetition to a program of current withdrawal corresponding to the known past program of oil withdrawal will not result in a potential variation at terminal 130 corresponding to the observed history of pressure variation. The problem, then, is adjustment of the analog parameters to secure a potential variation at 130 to correspond with the observed pressure variation.

It will be noted from FIGURE 7 that the differential and output circuit of FIGURE 6 has two inputs. One is from terminal 130 representing potential variation of this terminal actually resulting from operation with a particular setting of the analog parameters. The other is from terminal 214 representing a potential variation which is set by adjustments in FIGURES 1 and 3 to correspond to the known pressure variation of the reservoir. What is then required is comparison of these two inputs and adjustment of the parameters desirably in a systematic fashion to bring the two inputs into correspondence. When correspondence is achieved to a sufficient extent, it may then be validly considered that the analog is in proper quantitative correspondence with the original system, and accordingly its further arbitrary operation will correspond to that of the original system within the limits of approximation thereto which may be achieved with a finite number of adjustable parameters and with the particular analog characteristics involved.

The comparison may be made in two different fashions which will now be described.

Considering the first type of comparison, with switch 332 engaging contact 84, operation is as follows:

Multivibrator 2 produces a generally rectangular wave through the line leading to condenser 16. When this wave is positive, there occurs charging of the network through the circuit of FIGURE 3 and condenser 220 is discharged. When the wave becomes negative, the measuring part of the cycle starts with a beginning of operation of the series of phantastrons in FIGURE 1. As described above, the terminal 214 receives a predetermined waveform from the action of the timing phantastrons and the adding and integrating circuits of FIGURE 3.

The terminal 130 receives a potential decline variation from the water drive network and analog 414 which, together, constitute a complete analog which is representative of others which might be provided.

As was pointed out above, there is produced by the successive operations of the several phantastrons in FIGURE 1 a negative waveform at terminal 84 which is interrupted only transiently by the production of pulses at the instants of transitions from operation of one phantastron to operation of the next. From the standpoint of the type of operation now being discussed, these transients are negligible in duration and it may be considered that, practically, the terminal 84 is rendered negative throughout the measuring period. This negative condition of terminal 84 is imposed on the grid of triode 340 effecting cut-off of this triode and rendering operative the differential amplifier stage constituted by the triodes 322 and 324. In short, the differential amplifier shown in FIGURE 6 operates throughout the measuring part of the cycle. The result, then, is the provision of a signal at terminal 400 which is measured by the meter indicated at 401 in FIGURE 7 and represents the integral of the squares of the instantaneous differences between the inputs at terminals 130 and 214 through the duration of the measuring part of each cycle. The output at terminal 400 provides a waveform giving the integral as a function of time repeated in each repetition cycle. Usually, the final or peak value of this integral is desired, and, therefore, the meter 401 is desirably either a peak-reading vacuum tube voltmeter or a time gated meter which would provide the final value, in each repetition cycle, of the integral waveform.

Alternatively, an ordinary current meter may be inserted in series with resistances 366 and 368 and condenser 370, in which case the current through it is given by expression ($a$) in FIGURE 6. Because of the integrating action of the meter movement, the meter will indicate the average value of the current waveform which is equal to the expression (c) divided by the repetition period. The last being constant, the meter reading will be proportional to the desired output integral. Meter sensitivity presents a limitation on the use of this system, however.

Considering the foregoing, it will now be apparent how adjustments are made. The integral just mentioned is to be minimized to try to secure correspondence between the output at terminal 130 with the predetermined waveform appearing at terminal 214. One of the parameters of the analog is adjusted to secure a minimum reading at the meter 401. Having secured this, another parameter is adjusted to secure again a minimum reading at meter 401 which, in general, will be less than that obtained the first time. Adjustments of the other parameters are then made sequentially, each adjustment resulting in a minimum reading at the meter. After all the parameters have been thus adjusted once, the adjustments are repeated sequentially, and this repetition is continued until no adjustment of a parameter produces a decrease in the reading at the meter. It will be evident that the procedure described will have resulted in adjustment of all of the parameters of the analog to secure a minimum value for the integral of the squares of the instantaneous differences between the actual and desired waveforms. Assuming convergence of the process, as will generally be the case, it will then be found that, if the analog itself is of a proper type, the actual and desired waveforms are very close to each other. The analog is then in a condition to be properly used for prediction of operation of the original system under arbitrarily assumed future conditions which may be programmed in the analog. In the foregoing, it has been assumed for simplicity that the integral is of the squares of the values of the differences, but in line with what has been heretofore said, depending upon the choice of resistances at 366 and 368, the integration may be of other powers of the absolute values of the instantaneous differences over the period of measurement.

It may here be noted that the function expressed in Equation *a* of FIGURE 6 may be very general and could not only be a power function but, if desired, an exponential, logarithmic or other function as desired of the absolute value of the differences of potential. Resistance 368 could be replaced by numerous vacuum tube or other circuits to give rise to the desired functional relationship, even including a unity power function of the absolute values of the differences.

The second type of comparison of the actual output waveform with the predetermined theoretical one may be made on a point by point basis with the switch 332 engaging contact 304.

As has been noted, the transitions between the operations of the phantastrons in FIGURE 1 involve the production of transients at terminal 84. These transients are differentiated by the arrangement of condenser 296 and resistor 297 in FIGURE 5 to provide positive pulses through diode 298 to the control grid of pentode 300. The result is the production, upon the occurrence of each of these transients, of a negative pulse of short duration at terminal 304. The negative pulses thus provided are applied to the grid of triode 340 to cut off this triode only through the durations of the pulses with the result of rendering the differential amplifier of FIGURE 6 operative only during such pulse durations. The result is that the absolute values of the differences of the waveforms at 130 and 214 at the instants of occurrence of these pulses are delivered to the integrating system of FIGURE 6, the result being the production at terminal 400 of the sum of the squares (or other powers or functions) of the absolute values of the differences between the two waveforms at a chosen series of time instants. Selection of the particular instants may, though not necessarily, be chosen so that this type of comparison represents approximate evaluation of an integral in the form of a summation, analogous to the use of such approximations in mathematical analysis. In other words, such integrals as are obtained with switch 332 in contact with terminal 84 may be approximated by the summations obtained when switch 332 is in contact with terminal 304. On casual consideration it might seem that this second type of comparison of the two waveforms is trivial if the first integrating type of comparison is available, since there would seem to be no use for approximate integration when continuous accurate integration may be obtained. Actually, however, this type of comparison has a special value as follows:

The actual past history of a system, such as an oil reservoir, may be available only on a basis of measurements made at certain, and perhaps quite irregularly spaced, times. Interpolation between such times may not be valid, for example, when the oil or gas withdrawal program was non-continuous. Obviously, then, better conformity of the analog to the actual system may be expected if the two outputs are compared at instants which correspond to the times of actual measurements. In other words, the analog may then be adjusted to cause its output to pass as nearly as possible, in accordance with the method of least squares or the generalized equivalent referred to herein, through "points" actually observed, rather than to conform to all points of a "curve" which, except for the observed points thereof, represents, at best, a smoothing of data.

While short time intervals of comparison are actually involved due to the width of the pulses during which comparisons are made, the effect is substantially that of comparison of corresponding time points.

A third alternative, utilizing the position of switch 332 in engagement with contact 294, involves comparison of the outputs at only a single selected instant in the repetition cycle. This comparison is primarily for a point by point check to determine the actual conformity of the two waveforms after conformation by one or the other of the foregoing methods is attempted.

Whatever may be the particular analog involved, what the present invention provides is comparison of its output, under a given forcing program, with some observed or theoretical output, both of these outputs having the same abscissae, which may be time as in the presented specific example or some other independent variable expressible in terms of time, the latter situation involving a preliminary transformation of variable to suit the situation involved. In other words, time by a suitable mathematical transformation of variable, may be made the independent variable for comparison of the two functions which are involved. It will be understood, however, that time is not necessarily the independent variable involved in the original problem.

What is claimed is:

1. Apparatus for the adjustment of an analog computer of a type involving variable parameters requiring setting so that in response to a predetermined driving input the computer will provide a predetermined output, said apparatus comprising means providing to said analog a predetermined driving input at at least one portion of a period to provide from the analog an output waveform during said period, means providing a predetermined waveform during said period, and means receiving simultaneously during said period both said output waveform from the analog and said predetermined waveform and providing an output approximately summing for said period the values at a plurality of time instants of a function of the absolute values of differences between said analog output waveform and said predetermined waveform.

2. Apparatus for the adjustment of an analog computer of a type involving variable parameters requiring setting so that in response to a predetermined driving input the computer will provide a predetermined output, said apparatus comprising means providing to said analog a predetermined driving input at at least one portion of a period to provide from the analog an output during said period, means providing a predetermined waveform during said period, and means receiving simultaneously during said period both said output from the analog and said predetermined waveform and providing an output approximately summing for said period the values at a plurality of time instants of squares of the differences between said analog output and said predetermined waveform.

3. Apparatus for the adjustment of an analog computer of a type involving variable parameters requiring setting so that in response to a predetermined driving input the computer will provide a predetermined output, said apparatus comprising means providing to said analog a predetermined driving input at at least one portion of a period to provide from the analog an output waveform during said period, means providing a predetermined waveform during said period, and means receiving simultaneously during said period both said output waveform from the analog and said predetermined waveform and providing an output approximately integrating for said period the values of a function of the absolute values of differences between said analog output waveform and said predetermined waveform.

4. Apparatus for the adjustment of an analog computer of a type involving variable parameters requiring setting so that in response to a predetermined driving input the computer will provide a predetermined output, said apparatus comprising means providing to said analog a predetermined driving input at at least one portion of a period to provide from the analog an output during said period, means providing a predetermined waveform during said period, and means receiving simultaneously during said period both said output from the analog and said predetermined waveform and providing an output approximately integrating for said period the values of squares of differences between said analog output and said predetermined waveform.

5. Apparatus for the adjustment of an analog computer of a type involving variable parameters requiring setting so that in response to a predetermined driving input the computer will provide a predetermined output, said apparatus comprising means providing to said analog a predetermined driving input at at least one portion of a period to provide from the analog an output during said period, means providing a predetermined waveform during said period, and means receiving simultaneously during said period both said output from the analog and said predetermined waveform and alternatively adjustable to provide either an output approximately summing for said period the values at a finite plurality of time instants of a function of the absolute values of differences between said analog output and said predetermined waveform, or an output approximately integrating for such period the values of a function of the absolute values of differences between said analog output and said predetermined waveform.

6. Apparatus for the adjustment of an analog computer of a type involving variable parameters requiring setting so that in response to a predetermined driving input the computer will provide a predetermined output, said apparatus comprising means providing to said analog a predetermined driving input at at least one portion of a period to provide from the analog an output during said period, means providing a predetermined waveform during said period, and means receiving simultaneously during said period both said output from the analog and said predetermined waveform and alternatively adjustable to provide either an output approximately summing for said period the values at a finite plurality of time instants of squares of differences between said analog output and said predetermined waveform, or an output approximately integrating for such period the values of squares of differences between said analog output and said predetermined waveform.

7. Apparatus for the adjustment of an analog computer of a type involving variable parameters requiring setting so that in response to a predetermined driving input the computer will provide a predetermined output, said apparatus comprising means providing to said analog a predetermined driving input at at least one portion of a period to provide from the analog an output during said period, means providing a predetermined waveform during said period, and means receiving simultaneously during said period both said output from the analog and said predetermined waveform and alternatively adjustable to provide either an output approximately summing for said period the values at a finite plurality of time instants of a function of the absolute values of differences between said analog output and said predetermined waveform, or an output indicating the difference between said analog output and said predetermined waveform at a chosen instant of said period.

8. Apparatus for the adjustment of an analog computer of a type involving variable parameters requiring setting so that in response to a predetermined driving input the computer will provide a predetermined output, said apparatus comprising means providing to said analog a predetermined driving input at at least one portion of a period to provide from the analog an output during said period, means providing a predetermined waveform during said period, and means receiving simultaneously during said period both said output from the analog and said predetermined waveform and alternatively adjustable to provide either an output approximately integrating for such period the values of a function of the absolute values of differences between said analog output and said predetermined waveform or an output indicating the difference between said analog output and said predetermined waveform at a chosen instant of said period.

9. Apparatus for the adjustment of an analog computer of a type involving variable parameters requiring setting so that in response to a predetermined driving input the computer will provide a predetermined output, said apparatus comprising means providing to said analog a predetermined driving input at at least one portion of each of a series of successive periods to provide from the analog an output waveform during each period, means providing a predetermined waveform during each of said successive periods, and means receiving simultaneously during each of said periods both said output waveform from the analog and said predetermined waveform and providing an output approximately summing for each of said periods the values at a plurality of time instants of a function of the absolute values of differences between said analog output waveform and said predetermined waveform.

10. Apparatus for the adjustment of an analog computer of a type involving variable parameters requiring setting so that in response to a predetermined driving input the computer will provide a predetermined output, said apparatus comprising means providing to said analog a predetermined driving input at at least one portion of each of a series of successive periods to provide from the analog an output during each period, and means receiving simultaneously during each period of said periods both said output from the analog and said predetermined waveform and providing an output approximately summing for each of said periods the values at a plurality of time instants of squares of the differences between said analog output and said predetermined waveform.

11. Apparatus for the adjustment of an analog computer of a type involving variable parameters requiring setting so that in response to a predetermined driving input the computer will provide a predetermined output, said apparatus comprising means providing to said analog a predetermined driving input at at least one portion of each of a series of successive periods to provide from the analog an output waveform during each period, means providing a predetermined waveform during each of said successive periods, and means receiving simultaneously during each of said periods both said output waveform from the analog and said predetermined waveform and providing an output approximately integrating for each of said periods the values of a function of the absolute values of differences between said analog output waveform and said predetermined waveform.

12. Apparatus for the adjustment of an analog computer of a type involving variable parameters requiring setting so that in response to a predetermined driving input the computer will provide a predetermined output, said apparatus comprising means providing to said analog a predetermined driving input at at least one portion of each of a series of successive periods to provide from the analog an output during each period, and means receiving simultaneously during each of said periods both said output from the analog and said predetermined waveform and providing an output approximately integrating for each of said periods the values of squares of differences between said analog output and said predetermined waveform.

13. Apparatus for the adjustment of an analog computer of a type involving variable parameters requiring setting so that in response to a predetermined driving input the computer will provide a predetermined output, said apparatus comprising means providing to said analog a predetermined driving input at at least one portion of a period to provide from the analog an output waveform during said period, means providing a predetermined waveform during said period, and means receiving simultaneously during said period both said output from the analog and said predetermined waveform and providing an output corresponding to the absolute values of the differences between said analog output and said predetermined waveform.

14. Apparatus comprising means providing a pair of different independently variable outputs during a period, and means receiving simultaneously during said period both of said outputs and providing an output approximately summing for said period the values at a plurality of time instants of a function of the absolute values of the differences between the first mentioned outputs.

15. Apparatus comprising means providing a pair of different independently variable outputs during a period, and means receiving simultaneously during said period both of said outputs and providing an output approximately integrating for said period the values at a plurality of time instants of a function of the absolute values of the differences between the first mentioned outputs.

16. Apparatus comprising means providing a pair of different independently variable outputs during a period, and means receiving simultaneously during said period both of said outputs and providing an output approximately summing for said period the values at a finite plurality of time instants of a function of the absolute values of the differences between the first mentioned outputs.

17. Apparatus for the adjustment of an analog computer of a type involving variable parameters requiring setting so that in response to a predetermined driving input the computer will provide a predetermined output, said apparatus comprising means providing to said analog a predetermined driving input at at least one portion of each of a series of successive periods to provide from the analog an output during each period, means providing a predetermined waveform during each of said periods, and means receiving simultaneously during each of said periods both said output from the analog and said predetermined waveform and providing an output corresponding to the absolute values of the differences between said analog output and said predetermined waveform.

18. Apparatus comprising means providing a pair of different independently variable outputs during each of a series of successive periods, and means receiving simultaneously during each of said periods both of said outputs and providing an output corresponding to the absolute values of the differences between the first mentioned outputs.

19. Apparatus comprising means providing a pair of different independently variable outputs during each of a series of successive periods, and means receiving simultaneously during each of said periods both of said outputs and providing an output approximately summing for each of said periods, the values at a plurality of time instants of a function of the absolute values of the differences between the first mentioned outputs.

20. Apparatus comprising means providing a pair of different independently variable outputs during each of a series of successive periods, and means receiving simultaneously during each of said periods both of said outputs and providing an output approximately integrating for each of said periods the values at a plurality of time instants of a function of the absolute values of the differences between the first mentioned outputs.

21. Apparatus comprising means providing a pair of different independently variable outputs during each of a series of successive periods, and means receiving simultaneously during each of said periods both of said outputs and providing an output approximately integrating for each of said periods the values at a finite plurality of time instants of a function of the absolute values of the differences between the first mentioned outputs.

References Cited in the file of this patent

UNITED STATES PATENTS

| | | |
|---|---|---|
| 2,427,463 | Klemperer et al. | Sept. 16, 1947 |
| 2,557,070 | Berry | June 19, 1951 |
| 2,764,679 | Berkowitz | Sept. 25, 1956 |

OTHER REFERENCES

"Electronic Analogue Computers" (Korn & Korn), p. 229, McGraw-Hill Book Co., 1952.

"Electronic Analogue Computers" (Korn & Korn), pp. 30, 213–214, McGraw-Hill Book Co., 1952.

Macnee, A. B.: The Review of Scientific Instruments, vol. 24, No. 3, March 1953, pp. 207–211.

Designing Industrial Controllers by Analog (Philbrick) Electronics, June, 1948, pp. 108–111.

The Electro-Analogue, An Apparatus for Studying Regulating Systems (Janssen and Ensing), Philips Technical Review, vol. 12, No. 9, March 1951, pp. 257–271.